US012097653B2

(12) United States Patent
Smithson et al.

(10) Patent No.: US 12,097,653 B2
(45) Date of Patent: Sep. 24, 2024

(54) SECURING POLYMER LINERS WITHIN PIPES

(71) Applicant: Subsea 7 Limited, Sutton (GB)

(72) Inventors: Mark Robert Smithson, Crossford (GB); Graham Wood, Newbigging (GB)

(73) Assignee: SUBSEA 7 LIMITED, Sutton (GB)

( * ) Notice: Subject to any disclaimer, the term of this patent is extended or adjusted under 35 U.S.C. 154(b) by 393 days.

(21) Appl. No.: 17/608,450

(22) PCT Filed: Apr. 30, 2020

(86) PCT No.: PCT/GB2020/051055
§ 371 (c)(1),
(2) Date: Nov. 2, 2021

(87) PCT Pub. No.: WO2020/225532
PCT Pub. Date: Nov. 12, 2020

(65) Prior Publication Data
US 2022/0212395 A1 Jul. 7, 2022

(30) Foreign Application Priority Data
May 3, 2019 (GB) .................................. 1906314

(51) Int. Cl.
F16L 55/165 (2006.01)
B29C 63/34 (2006.01)
F16L 58/10 (2006.01)

(52) U.S. Cl.
CPC ........ B29C 63/346 (2013.01); F16L 55/1654 (2013.01); F16L 58/1036 (2013.01)

(58) Field of Classification Search
CPC . F16L 55/165; F16L 55/1652; F16L 55/1653; B29C 49/26; B29C 63/34; B29C 63/341
(Continued)

(56) References Cited

U.S. PATENT DOCUMENTS 3,996,967 A * 12/1976 Takada ................... B29C 49/26
156/287
4,069,573 A * 1/1978 Rogers, Jr. .......... B21D 26/041
29/523

(Continued)

FOREIGN PATENT DOCUMENTS

EP 0 366 299 5/1990
EP 2 990 707 3/2016
(Continued)

Primary Examiner — Patrick F Brinson
(74) Attorney, Agent, or Firm — MATTINGLY & MALUR, PC

(57) ABSTRACT

A method of manufacturing a length of lined pipe inserts a radially contracted liner pipe into an outer host pipe. Injector needles are inserted through an end of the outer pipe into an annular gap between the pipes. Adhesive is injected between the pipes at locations inboard of the end of the outer pipe. After withdrawing the injectors, at least a portion of the liner pipe is expanded to close the gap and to bond the pipes together via the injected adhesive. Shims can be inserted into the gap between the pipes. A portion of the liner pipe inboard of the shims can be expanded radially while the shims constrain local radial expansion of an outboard portion of the liner pipe to maintain the gap for accommodating the injectors. Withdrawing the shims after injecting the adhesive allows radial expansion of the outboard portion to close the gap between the pipes.

32 Claims, 5 Drawing Sheets

(58) Field of Classification Search
USPC .......... 138/98, 97; 405/155, 157; 156/294, 156/287; 264/36, 512, 514–516
See application file for complete search history.

(56) References Cited

U.S. PATENT DOCUMENTS

| | | | | |
|---|---|---|---|---|
| 4,325,772 | A * | 4/1982 | Suetoshi | F16L 58/1027 |
| | | | | 156/295 |
| 4,367,105 | A * | 1/1983 | Rosier | B29C 44/324 |
| | | | | 428/319.3 |
| 4,583,672 | A * | 4/1986 | Bibb | B23K 20/085 |
| | | | | 228/175 |
| 4,777,984 | A * | 10/1988 | Storah | B29C 49/26 |
| | | | | 138/98 |
| 4,950,356 | A * | 8/1990 | Grace | F16L 55/1645 |
| | | | | 264/270 |
| 5,048,174 | A * | 9/1991 | McGuire | B29C 63/34 |
| | | | | 29/402.09 |
| 5,265,648 | A * | 11/1993 | Lyon | F16L 55/1653 |
| | | | | 264/269 |
| 5,839,475 | A * | 11/1998 | Maine | F16L 55/1652 |
| | | | | 264/269 |
| 8,398,119 | B2 | 3/2013 | Kenworthy | |
| 8,942,552 | B2 | 1/2015 | Pionetti et al. | |
| 10,400,935 | B1 | 9/2019 | Kim et al. | |
| 2014/0261832 | A1 | 9/2014 | Kiest, Jr. et al. | |

FOREIGN PATENT DOCUMENTS

| | | |
|---|---|---|
| GB | 1 297 293 | 11/1972 |
| GB | 2 353 581 | 2/2001 |
| GB | 2504261 | 1/2014 |
| GB | 2516301 | 1/2015 |
| KR | 10-1963176 | 3/2019 |
| WO | WO 2010/041016 | 4/2010 |
| WO | WO 2012/017171 | 2/2012 |
| WO | WO 2016/009361 | 1/2016 |

* cited by examiner

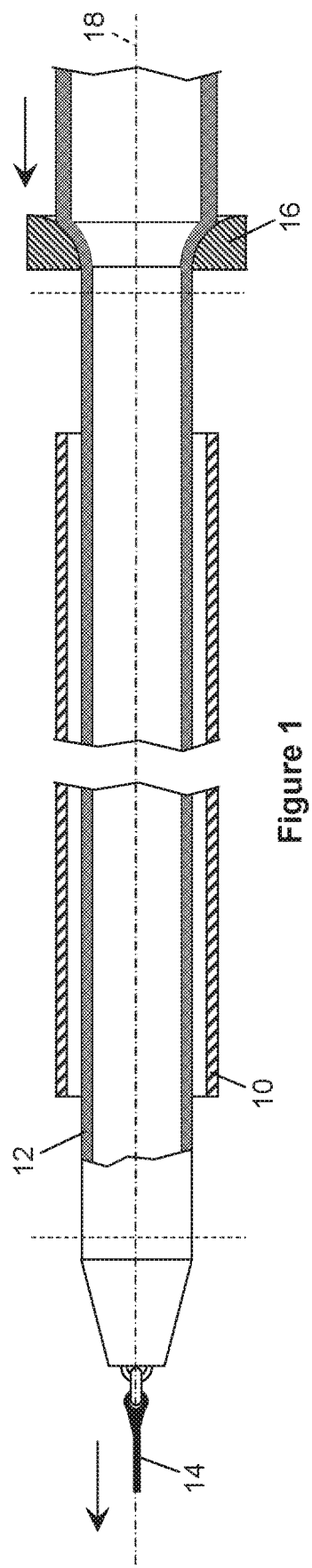
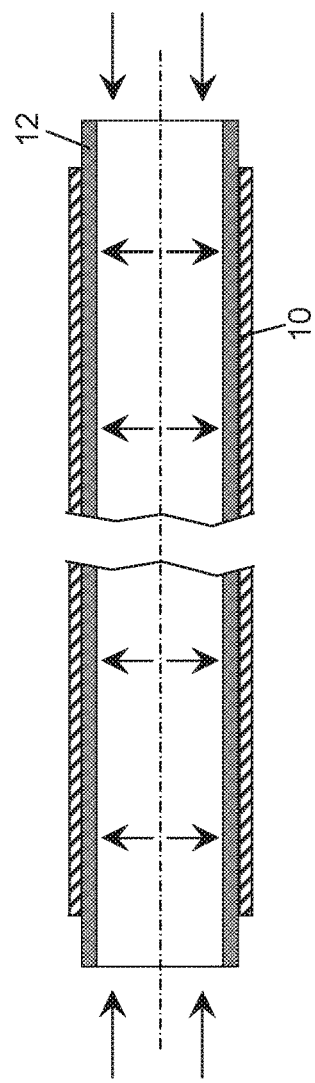
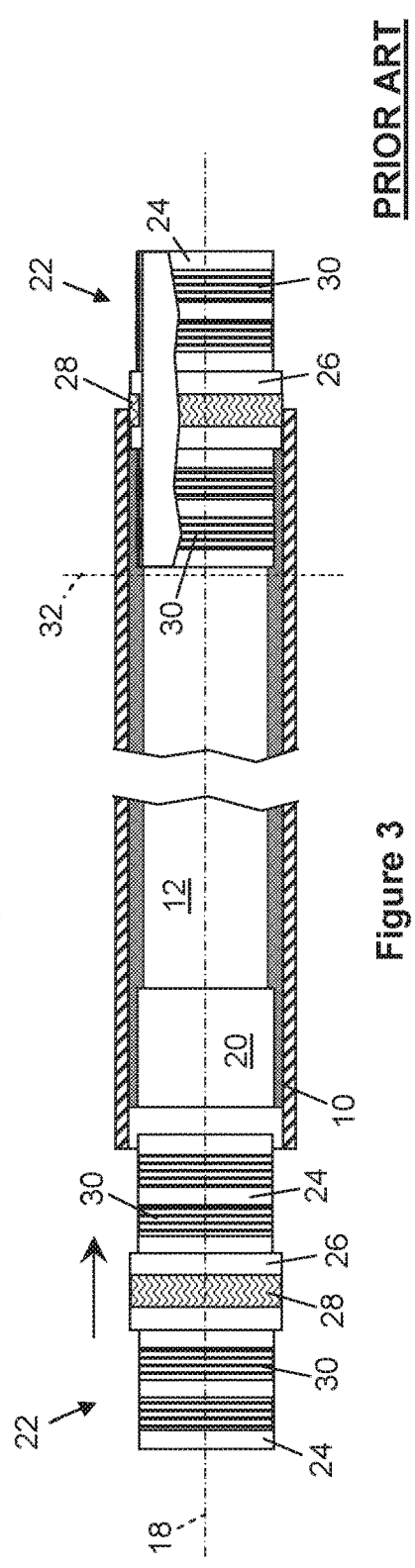

SECURING POLYMER LINERS WITHIN PIPES

This invention relates to polymer-lined pipes, particularly pipes that require a liner bridge between parent liners of conjoined pipe lengths.

Corrosion protection is a key issue for pipelines such as those used in the oil and gas industry, which are usually made of carbon steel to reduce their cost over often great lengths. Polymer liners are used to mitigate internal corrosion of such pipelines, as an alternative to more expensive liners of corrosion-resistant alloys. Polymer liners also aid thermal insulation of the pipeline, which can be particularly beneficial in subsea applications. Such liners may be of fibre-reinforced composites or solid plastics, for example of high-density polyethylene (HDPE).

The most common method for installing a polymer lining in a pipeline is to pull a folded or collapsed liner through the pipeline and then to inflate or expand the liner to the internal diameter of the pipeline. For example, GB 2504261 discloses the use of a pressurised fluid to expand a polymer liner pipe into engagement with a host pipe.

An alternative and improved method for installing a polymer lining in a pipeline, known as die drawing, was originally developed by British Gas and has been commercialised by a sister company of the Applicant under the registered trade mark Swagelining.

In die drawing, a polymer liner pipe has an initial outer diameter that is greater than the inner diameter of a host pipe to be lined. To reduce its outer diameter by elastic deformation, the liner pipe is pulled through an annular swage die that is spaced longitudinally from a proximal end of the host pipe. For this purpose, a draw line extends along the host pipe from the opposite, distal end of the host pipe. The draw line is attached to a distal end of the liner pipe and is tensioned by a jack system to pull the liner pipe through the swage die, which tapers in the pulling direction.

As the liner pipe is drawn through the swage die, the taper of the swage die reduces the outer diameter of the liner pipe to less than the inner diameter of the host pipe. Consequently, the distal end of the liner pipe can enter the proximal end of the host pipe. The liner pipe retains its reduced diameter while sufficient longitudinal tension is maintained between the draw line and the swage die.

In this narrowed swaged condition, the liner pipe can slide telescopically within the host pipe until a distal end portion of the liner pipe protrudes from the distal end of the host pipe. A proximal end portion of the liner pipe is similarly left protruding from the proximal end of the host pipe, in the gap between the host pipe and the swage die. In this respect, it will be apparent that the liner pipe lengthens as its outer diameter reduces.

When the liner pipe is in the correct longitudinal position with respect to the host pipe, tension in the draw line is released to initiate a process of reversion. During reversion, the elasticity of the polymer liner pipe material draws the protruding end portions of the liner pipe back into the corresponding ends of the host pipe. Simultaneously, the liner pipe expands radially outwardly to press against the inner surface of the host pipe. This elastic engagement of the oversized liner pipe with the interior of the host pipe stops the longitudinal contraction of the liner pipe. Outer end portions of the liner pipe that still protrude from the host pipe are then cut back to the ends of the host pipe. The liner pipe thereby becomes a polymer liner of the host pipe.

Die drawing was originally developed for in situ remediation of service pipes on land, such as gas mains or water mains that require strengthening or repair. More recently, die drawing has been adopted by the subsea oil and gas industry to produce lengths of lined steel pipe known as pipe joints or pipe stalks. For example, such lengths of polymer-lined steel pipe may be joined together end-to-end at a coastal spoolbase when manufacturing a corrosion-resistant subsea pipeline to be installed in a reel-lay operation.

When fabricating a lined pipeline, it is necessary to weld together sections or lengths of lined steel pipe while maintaining a continuous corrosion-resistant internal surface between them. In this respect, welding polymer-lined steel pipes is not straightforward because the liner is likely to be damaged by the heat of welding. Additional tubular heat-resistant bridging parts, namely liner bridges, are therefore required to cope with the heat of welding while ensuring continuity between the parent liners of the conjoined pipe lengths. Moreover, the interfaces between the liner bridge and the parent liners have to be sealed to close potential leak paths for the pressurised fluid that will be carried by the pipeline in use. Sealing may be achieved mechanically, by bonding and/or by electrofusion.

A typical polymer liner bridge is disclosed in EP 0366299. WO 2010/041016, WO 2012/017171 and GB 2516301 disclose electrofusion fittings that serve as liner bridges. In electrofusion fittings, the liner bridge comprises a sleeve of a thermoplastics material that includes heating coils around each end.

In readiness for fabrication, a parent liner is machined back from an end of a first length of lined steel pipe to create a recess or socket. A tubular first end portion of a polymer liner bridge is inserted into the socket to abut and seal against the parent liner of the first pipe length. The socket of a correspondingly-machined second length of lined steel pipe is slid telescopically onto an opposed second end portion of the liner bridge left protruding from the first pipe length. The second end portion of the liner bridge abuts and seals against the parent liner of the second pipe length. The first and second pipe lengths are then welded together end-to-end around their circumferential interface. The process is repeated when adding each successive pipe length that is required to complete the pipeline.

The sockets that are machined in the parent liners to receive an end portion of a liner bridge have to be dimensionally accurate in view of the need for sealing at the interfaces between the liner bridge and the parent liners. It is also desirable, for flow stability and pigging in use, that the inner surface of the lined pipeline is smooth and substantially continuous across those interfaces. Thus, dimensional accuracy must be maintained until a pipe length has been joined end-to-end with similar pipe lengths when fabricating a pipeline. However, there is a risk that the liner pipe could slip axially within and relative to the steel pipe. There is also a possibility of a liner collapsing if it loses strength with ageing.

In this respect, contact of the liner pipe with the host pipe is never perfect, meaning that air pockets or a residual micrometric annular gap may remain at the interface between them. Also, as expansion of the liner pipe is constrained by the surrounding host pipe, residual elastic stresses remain in the liner pipe. Thus, the liner pipe may retain some ability to slip spontaneously inside the host pipe.

There is therefore a risk that a parent liner could retract further into a length of host pipe before or during the process of assembly with a liner bridge, and before welds between the liner bridge and the parent liners of adjoining pipe lengths have been completed.

Conventionally, mitigation of liner slippage involves bonding the liner pipe to the host pipe with an intermediate adhesive. For example, adhesive may be sprayed onto the inner surface of the host pipe and/or onto the outer surface of the liner pipe. A drawback of this method is that the adhesive layer can become inconsistent by being removed or scraped by accidental contact when pulling the liner pipe through the host pipe.

In EP 2990707, a pressure-sensitive adhesive is used and is activated by contact between the liner pipe and the host pipe. This has the additional disadvantage that the liner pipe could become bonded to the host pipe before being pulled fully through the host pipe.

A fabric liner sleeve can also be pre-impregnated or saturated with a curable polymer adhesive as described in WO 2016/009361. In this case, bonding is effective only after curing the adhesive polymer, which introduces the delay of an additional curing phase. Moreover, an internal tool may be required to stimulate or to accelerate curing, for example by applying heat or UV light to the liner. More generally, techniques that are apt for use with porous fabric liners are not apt for use with continuous, smooth polymer liners.

If a host pipe is of polymer, a liner tube may be impregnated with adhesive and then the host pipe may be extruded onto the liner tube as described in GB 1297293. Clearly, however, this method is not suitable for a host pipe of steel that contains a liner pipe of polymer.

As a more general comment, prior art techniques to mitigate liner slippage with adhesive take the approach of bonding over the full area of the interface between the liner and the host pipe. The invention takes a different approach, equipped with the insight that it is neither necessary nor desirable to bond over the full interface area where radial expansion of a die-drawn liner pipe applies enough pressure to be well engaged with the host pipe. Thus, the invention uses adhesive as a back-up measure to improve attachment of a die-drawn liner pipe that is already engaged with a surrounding host pipe. This is in contrast to the prior art, which seeks to rely upon adhesive to effect primary attachment of a liner to a pipe.

Against this background, the invention resides in a method of manufacturing a length of lined pipe. The method comprises: radially contracting a liner pipe, for example by die drawing; inserting the radially-contracted liner pipe into a host pipe; inserting at least one injector through an end of the host pipe and into an annular gap between the liner pipe and the host pipe; injecting an adhesive through the or each injector at one or more locations, the or each location being between the liner pipe and the host pipe and longitudinally inboard of the end of the host pipe; at least partially withdrawing the or each injector from the end of the host pipe; and radially expanding at least a portion of the liner pipe to close the annular gap and to bond the liner pipe to the host pipe via the injected adhesive.

The method of the invention may also comprise: inserting at least one shim through the end of the host pipe and into the annular gap between the liner pipe and the host pipe; radially expanding a longitudinally inboard portion of the liner pipe against a radially inner surface of the host pipe; by action of the shims, maintaining the annular gap for injection of the adhesive by constraining local radial expansion of a longitudinally outboard portion of the liner pipe; and withdrawing the or each shim from the end of the host pipe to permit radial expansion of the longitudinally outboard portion of the liner pipe to close the annular gap after injecting the adhesive. The or each shim may also serve as an injector.

The or each injector is preferably inserted into the annular gap after completing insertion of the liner pipe into the host pipe. Similarly, the or each shim is preferably inserted into the annular gap after completing insertion of the liner pipe into the host pipe. The or each injector is preferably inserted into the annular gap after inserting the or each shim into the annular gap.

The liner pipe may be expanded radially by elastic reversion and/or by applying radially-outward force against a radially inner surface of the liner pipe. In the latter case, the radially-outward force applied against the inner surface of the liner pipe is suitably maintained until the adhesive has substantially cured.

The adhesive may be injected at locations that are spaced apart circumferentially from each other around the liner pipe. For example, a plurality of injectors may be inserted, conveniently together, into the end of the host pipe to perform injection of adhesive at those locations. The injectors of the plurality are apt to be supplied from a shared source of the adhesive.

The method of the invention may further comprise machining a liner bridge socket into the liner pipe after closing the annular gap. In that case, the or each location at which the adhesive is injected may advantageously be longitudinally inboard of the liner bridge socket. A liner bridge in the form of an electrofusion fitting may be inserted into engagement with the socket, while preferably leaving all heating elements of the liner bridge on a longitudinally outboard side of the injected adhesive.

An outer surface of the liner pipe may be treated by plasma surface treatment, flame treatment or acid etching before the liner pipe is inserted into the host pipe.

Injection of the adhesive may be repeated after partially withdrawing the or each injector from the end of the host pipe, or may take place while withdrawing the or each injector from the end of the host pipe.

The inventive concept extends to a lined pipe, comprising: a host pipe, for example of steel; an inner liner pipe, for example of polymer, that is engaged with the host pipe primarily by elastic radial expansion of the liner pipe along a mutual interface that extends along substantially the full length of the liner pipe; and a secondary adhesive fixing at which the liner pipe is bonded to the host pipe; wherein the secondary adhesive fixing comprises one or more discrete deposits of adhesive placed between the liner pipe and the host pipe at one or more locations spaced longitudinally inboard from an end of the host pipe.

Two or more of the adhesive deposits may be spaced circumferentially from each other around the liner pipe and/or longitudinally from each other along the liner pipe. The or each adhesive deposit may be elongated in the longitudinal direction.

The liner pipe may be shaped to define a liner bridge socket that is inset from the end of the host pipe, in which case the or each adhesive deposit is preferably located longitudinally inboard of the liner bridge socket. Where a liner bridge in the form of an electrofusion fitting is engaged with the liner bridge socket, all heating elements of the liner bridge are preferably on a longitudinally outboard side of the or each adhesive deposit.

The inventive concept also embraces a lined pipeline comprising a series of pipes of the invention, welded together end-to-end, and a hydrocarbon production installation comprising one or more of those lined pipelines.

In summary, the invention mitigates the risk of liner slippage by using an adhesive to bond a liner to a host pipe over a short length or small area that is sufficient to resist the maximum possible retraction force acting on the liner before the liner is machined to accept the liner bridge. The use of an adhesive can also be of general use when installing liner bridge systems to ensure that retraction of the liner cannot occur at any stage during the liner bridge installation.

More specifically, the inventive concept involves the application of adhesive to the annular space between a host pipe and a polymeric liner after the liner has substantially fully reverted to provide a tight fit against the internal diameter of the host pipe. The adhesive is of sufficient surface area and strength that when fully cured it has enough load-carrying capacity to prevent any residual stress in the liner from causing the liner to retract further into the host pipe.

Commercial off-the-shelf adhesives have been used to implement the invention but the effectiveness of the adhesive is reliant on selection of the most appropriate adhesive for the service conditions. In an ideal scenario, no or very little surface preparation will be required. For bonding HDPE liners to steel pipes, a low surface-energy adhesive of the acrylate type has been found to be most suitable.

If using other adhesives, it may be necessary to increase the surface energy of the HDPE to obtain reliable adhesion. Typically this is done using one of several methods such as vacuum or atmospheric plasma surface treatment, flame treatment or chromic acid etching of the HDPE surface. Other adhesives that can be used with the application of a surface treatment include, but are not limited to, general-purpose two-part acrylic adhesives, two-part epoxy adhesives, single- and two-part polyurethane adhesives, anaerobic adhesives, cyanoacrylate adhesives and hot-melt adhesives.

The adhesive is applied to the annular area between the host steel pipe and the polymer liner pipe once the liner pipe has been fully installed into the host pipe. If the liner is fully tight to the internal diameter of the host pipe, the liner must be moved away from the internal diameter of the host pipe so that the adhesive can be applied to the correct location.

It is important that adhesive is applied to an area beyond the liner bridge weld zone to prevent interference with liner bridge installation. To achieve this, long steel shims may be inserted into the annular space between the liner pipe and the host steel pipe either during the lining process or after the lining process is complete but before the tensile load on the liner pipe is removed. Typically two shims are positioned at diametrically-opposed locations (analogous to nine o'clock and three o'clock positions) but any number of shims can be inserted provided that there is enough room. The liner is then left to revert fully until it achieves a tight fit against the interior of the host pipe with the exception of the small area where the shims are located.

After a suitable reversion period, normally at least 24 hrs, thin injection needles can be used to inject a small amount of adhesive at the end of the shims between the liner pipe and the host pipe. The shims are then withdrawn manually and a pipe expander may be used to expand the liner pipe mechanically, locally to the area where the adhesive has been applied. This ensures that the liner pipe and the host pipe are in direct contact where the adhesive has been applied as it cures, and also spreads the adhesive to ensure a minimum bondline thickness. The adhesive is then left to cure fully and the pipe expander is then withdrawn.

Whilst the use of adhesives to bond liners to steel pipes is generally known, the invention relates particularly to a method of application that allows adhesive to be applied after the liner is otherwise fully tight to the internal diameter of the host steel pipe.

Thus, the invention proposes an improved method to spot-glue a die-drawn liner pipe within a host pipe. Even local pre-application or pre-impregnation of the liner pipe is not preferred by the invention. This is because pre-applied or pre-impregnated adhesive could still be removed accidentally when pulling the liner pipe through the host pipe.

Embodiments of the invention implement a method for locally gluing a polymer liner to a host pipe such as a steel pipe, the method comprising: pulling the liner at least partially throughout the host pipe by die drawing; inserting at least one needle between the liner and the host pipe from a pipe end while the liner is extended; releasing pulling force so that the liner reverts to the host pipe inner diameter; injecting adhesive through the needle; and removing the needle.

Elastic radial pressure of the liner after reversion is sufficient to bond the liner to the adhesive and the adhesive to the host pipe. Pressure-sensitive adhesive may be used, for example as disclosed in EP 2990707.

Several needles may be used. Multiple needles may be mounted on a support shim and may be fed by a unique glue reservoir.

The support shim may be coupled temporarily to the pipe end. The needles may then be removed by uncoupling the shim from the pipe end in an axial direction.

Optionally, the steps of releasing pulling force on the liner and injecting adhesive may be inverted so that adhesive is injected before pulling force on the liner is released. Similarly, the or each needle could be removed before pulling force on the liner is released.

Thus, the invention provides a method of manufacturing a length of lined pipe. The method comprises inserting a radially-contracted liner pipe into an outer host pipe. Injector needles are inserted through an end of the outer pipe into an annular gap between the pipes. Adhesive is injected between the pipes at locations inboard of the end of the outer pipe. At least a portion of the liner pipe is expanded after withdrawing the injectors. This closes the gap and bonds the pipes together via the injected adhesive.

Shims may be inserted into the gap between the pipes. In this way, a major portion of the liner pipe inboard of the shims may be expanded radially while the shims constrain local radial expansion of a minor outboard portion of the liner pipe to maintain the gap that accommodates the injectors. Withdrawing the shims and the injectors after injecting the adhesive allows radial expansion of the outboard portion to close the gap between the pipes and hence to promote bonding of the pipes to each other.

In order that the invention may be more readily understood, reference now be made, by way of example, to the accompanying drawings in which:

FIGS. 1 to 3 are a sequence of schematic longitudinal sectional views of a prior art method for lining a length of pipe by die drawing;

Figure 4:
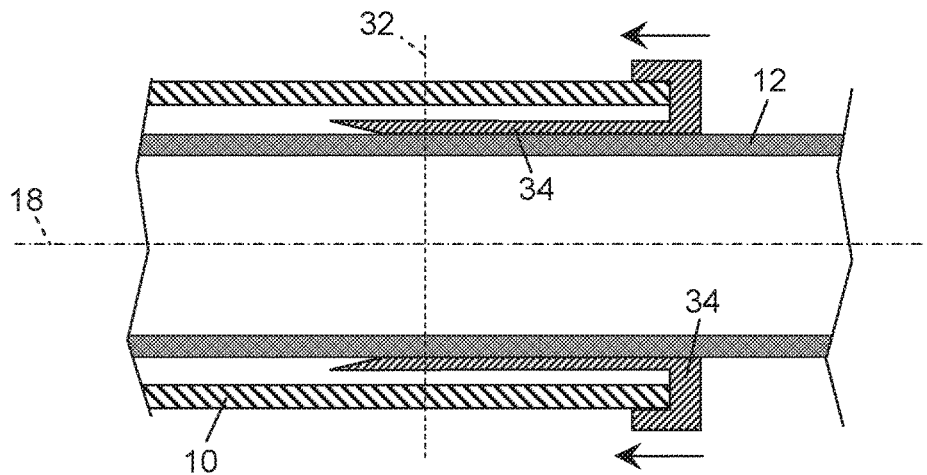
FIGS. 4 to 6 are a sequence of schematic detail views in longitudinal section showing initial steps of a method of the invention for lining a length of pipe, also involving die drawing.

FIGS. 1 to 3 show a prior art method for lining an outer host pipe in the form of a steel pipe joint 10 by die drawing a polymer liner pipe 12 along the interior of the pipe joint 10. The liner pipe 12 is pulled, from right to left as illustrated, by a draw line 14 that is attached to a tapered distal end of the liner pipe 12. The draw line 14 is tensioned by a conventional jack system, which is not shown.

As shown to the right side of FIG. 1, the liner pipe 12 initially has an outer diameter that is greater than the inner diameter of the pipe joint 10. Then, the liner pipe 12 is pulled through an annular swage die 16 that is spaced longitudinally from a proximal end of the pipe joint 10 and that tapers in the pulling direction. By causing radially-inward elastic deformation or contraction of the liner pipe 12, the swage die 16 reduces the outer diameter of the liner pipe 12 to less than the inner diameter of the pipe joint 10. The liner pipe 12 lengthens as its outer diameter reduces.

In this narrowed and elongated swaged condition, the liner pipe 12 is pulled telescopically through the pipe joint 10 while longitudinal tension is maintained in the liner pipe 12 between the draw line 14 and the swage die 16. The liner pipe 12 and the pipe joint 10 are substantially concentric about a common central longitudinal axis 18, although the liner pipe 12 may sag slightly under its own weight.

Pulling continues until a distal end portion of the liner pipe 12 protrudes from a distal end of the pipe joint 10 as shown in FIG. 1. A proximal end portion of the liner pipe 12 is similarly left protruding between the proximal end of the pipe joint 10 and the swage die 16 as also shown in FIG. 1. The outer extremities of the end portions of the liner pipe 12 are shown in FIG. 1 in dashed lines orthogonal to the central longitudinal axis 18. The liner pipe 12 is eventually severed at those locations.

When the liner pipe 12 is in the correct longitudinal position with respect to the pipe joint 10, tension in the draw line 14 is released. This initiates a reversion process that is shown completed in FIG. 2. During reversion, the elasticity of the polymer liner pipe 12 material draws most of the protruding end portions of the liner pipe 12 into the pipe joint 10 as the liner pipe 12 expands radially outwardly to press against the interior of the pipe joint 10.

When reversion is complete, the ends of the liner pipe 12 are machined back from the corresponding ends of the pipe joint 10 to create sockets 20 with a stepped profile as shown in FIG. 3. FIG. 3 also shows polymer liner bridges 22 whose stepped outer shape complements the sockets 20. One liner bridge 22 is shown in the process of being inserted into the socket 20 on the left end of the pipe joint 10. The other liner bridge 22 is shown already inserted into the socket 20 on the right end of the pipe joint 10 to abut and seal against the liner pipe 12 within.

Each liner bridge 22 comprises a tubular body of thermoplastics material comprising end portions 24 that are opposed longitudinally about a central ring 26. The body is substantially symmetrical about a central transverse plane that bisects the central ring 26. The central ring 26 carries a heat-resistant strip 28 that protects the liner bridge 22 from the heat of welding. Thus, the strip 28 aligns with an end of the pipe joint 10 when the liner bridge 22 is inserted fully into a corresponding socket 20.

The inner diameter of each liner bridge 22 substantially matches the inner diameter of the liner pipe 12 after reversion. This ensures that a pipeline formed by a series of lined pipe joints 10 will have a smooth and substantially continuous inner surface.

In this example, the liner bridges 22 are thermofusion fittings and so have heating coils 30 that encircle each end portion 24. The end portions 24 are received telescopically within complementary steps in the sockets 20 within the machined ends of the liner pipe 12. Energising the heating coils 30 with electric current induced in or conducted to the coils 30 fuses the liner bridges 22 to the liner pipe 12 at these telescopic interfaces, thus creating continuous circumferential seals between the liner bridges 22 and the liner pipe 12.

FIG. 3 shows a transverse boundary plane 32 that extends through the pipe joint 10 and the liner pipe 12 within, oriented orthogonally with respect to the central longitudinal axis 18. In this example, the boundary plane 32 is longitudinally inboard of the longitudinally-innermost end of the liner bridge 22. In other examples, the boundary plane 32 may be longitudinally inboard of the longitudinally-innermost heating coil 30 of the liner bridge 22. To ensure a good seal and a smooth interface with the liner bridge 22, dimensional accuracy of the machined liner pipe 12 is particularly important on the longitudinally-outboard side of the boundary plane 32.

Turning next to FIGS. 4 to 11, these drawings illustrate a method of the invention for lining a host pipe exemplified by a pipe joint 10, and apparatus for use in the method. Like numerals are used for like features. Whilst the method of the invention is shown being performed only on one end of the pipe joint 10, it will be apparent that the method may be applied to both ends of the pipe joint 10 simultaneously.

The method of the invention involves die drawing a liner pipe 12 through the pipe joint 10, as shown in FIGS. 1 to 3, but adds certain steps to that prior art method. The first of those steps is performed when, or potentially before, the liner pipe 12 is in the tensioned pre-reversion state shown in FIG. 1. The last of those steps is performed before the ends of the liner pipe 12 are machined back following reversion as shown in FIG. 3.

FIG. 4 shows longitudinally-extending shims 34 inserted from the end of the pipe joint 10 into the annular gap between the pipe joint 10 and swaged liner pipe 12. The shims 34 are inserted longitudinally when the liner pipe 12 is in the tensioned state shown in FIG. 1. However, in principle, the shims 34 could be inserted into the pipe joint 10 before the liner pipe 12 enters the pipe joint 10 or reaches its final longitudinal position with respect to the pipe joint 10. The shims 34 cross the boundary plane 32 so that their distal ends lie on the longitudinally inboard side of the boundary plane 32.

Figure 5:
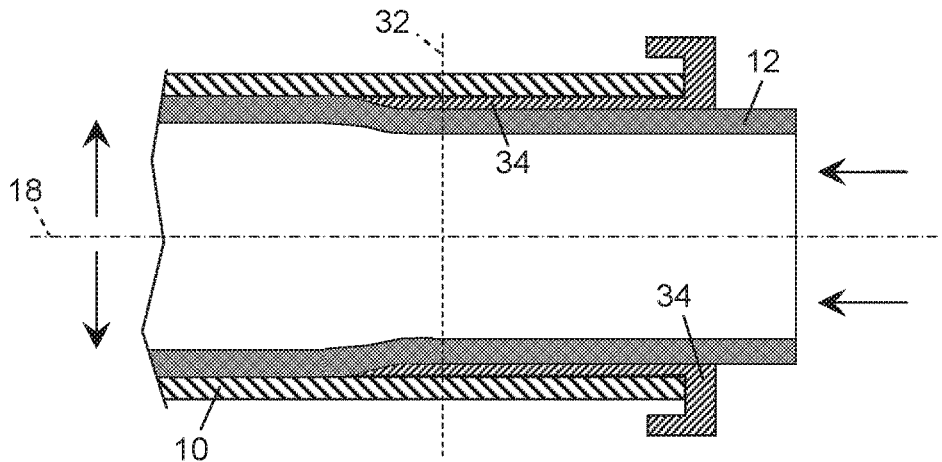

FIG. 5 shows the liner pipe 12 following reversion, after longitudinal tension applied to the liner pipe 12 has been released and therefore the liner pipe 12 has shrunk longitudinally and expanded radially in a manner analogous to FIG. 2. A longitudinally inboard portion of the liner pipe 12, offset longitudinally from the shims 34, bears against the surrounding pipe joint 10 continuously around their full circumferential interface. Conversely, a longitudinally outboard portion of the liner pipe 12, aligned with the shims 34, is spaced radially inwardly from the pipe joint 10 by the radial thickness of the shims 34. Thus, by virtue of the shims 34, the longitudinally outboard portion of the liner pipe 12 is constrained to expand radially to a lesser extent than the longitudinally inboard portion of the liner pipe 12.

Figure 6:
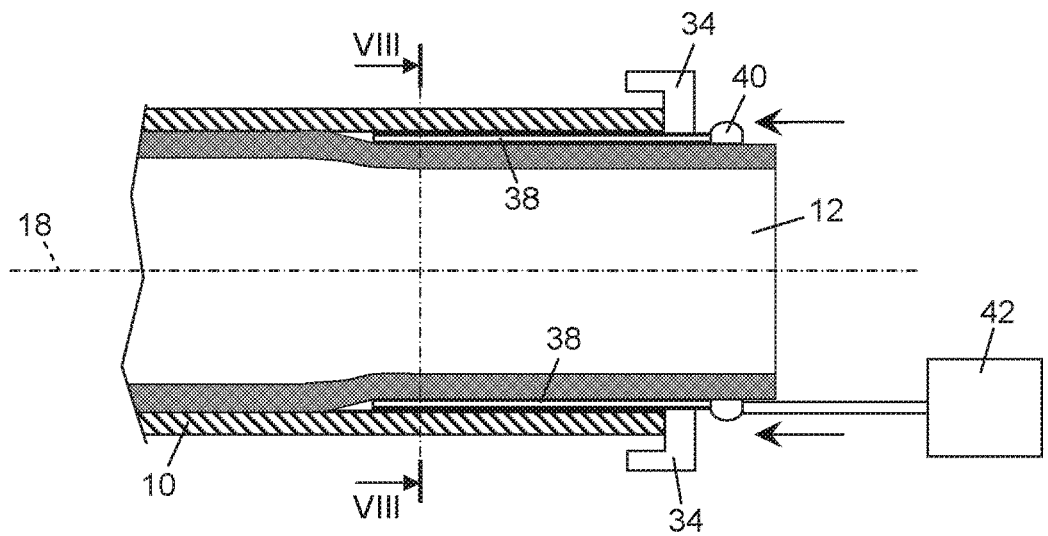
Figure 8:
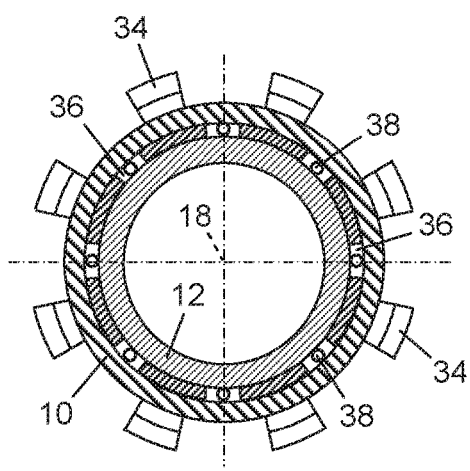
FIG. 8 is a cross-sectional view on line VIII-VIII of FIG. 6.

The radial spacing between the liner pipe 12 and the pipe joint 10 combines with the circumferential gaps between the shims 34 to define angularly-spaced longitudinally-extending elongate passageways 36 around the liner pipe 12. FIG. 6, and the corresponding cross-sectional view of FIG. 8 taken on the boundary plane 32, show these passageways 36 accommodating respective adhesive injectors in the form of longitudinally-extending needles 38. FIG. 8 shows that the shims 34 may be individual, separate components that are spaced apart angularly around the circumference of the liner pipe 12. There could be as few as two shims 34 diametrically opposed around the liner pipe 12.

Figure 7A:
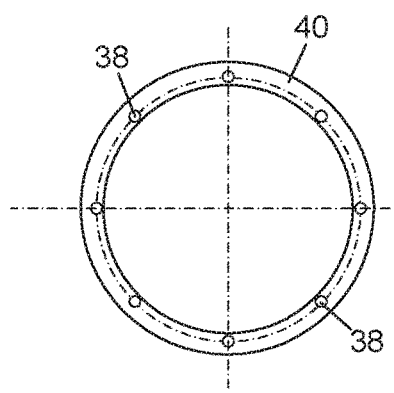
FIGS. 7a and 7b are, respectively, end and side views of an injection device for use in the method of the invention.
Figure 7B:
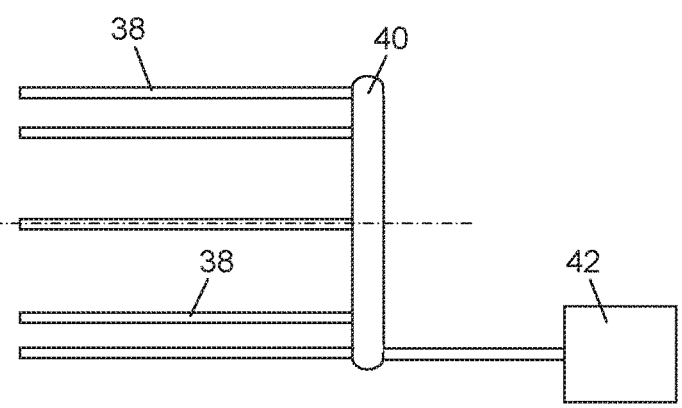

FIGS. 6, 7a and 7b show a ring manifold 40 that supports and connects the parallel needles 38 in an angularly-spaced circumferential array. The ring manifold 40 is in fluid communication with all of the needles 38 and is also in fluid communication with a source 42 of pressurised adhesive. The source 42 may, for example, comprise a reservoir and a pump, and may provide for mixing of adhesive components such as a resin and a curing agent before delivery of the adhesive to the needles 38 via the ring manifold 40.

Figure 9:
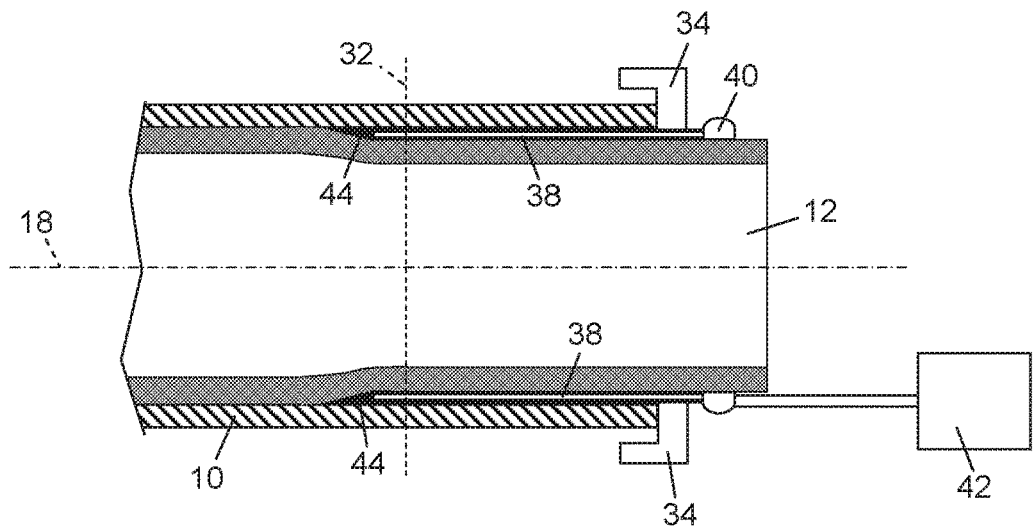
FIGS. 9 to 11 are a sequence of schematic detail views in longitudinal section showing further steps of the method of the invention.

As shown in FIG. 9, the needles 38 are positioned to inject an adhesive 44 into cavities defined between the liner pipe 12 and the pipe joint 10 at the distal ends of the needles 38, between the shims 34 that separate the needles 38. Like the shims 34, the needles 38 cross the boundary plane 32 so that their distal ends lie on the longitudinally inboard side of the boundary plane 32.

Figure 10:
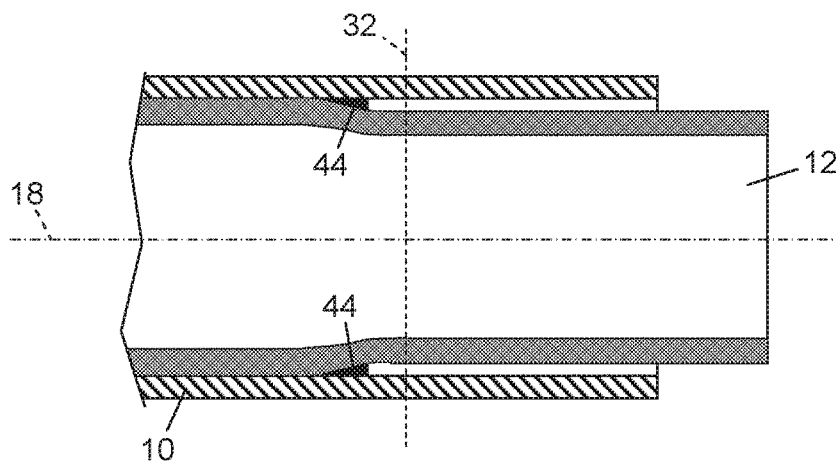

FIG. 10 shows the pipe joint 10 and the liner pipe 12 immediately after the shims 34 and needles 38 have been withdrawn from between them. Circumferentially-spaced deposits of the adhesive 44 are left behind between the pipe joint 10 and the liner pipe 12 on the longitudinally inboard side of the boundary plane 32. In FIG. 10, the outboard portion of the liner pipe 12 has not yet begun to expand radially against the interior of the pipe joint 10 but will soon do so as withdrawal of the shims 34 allows the process of reversion to resume and complete. As the liner pipe 12 expands, the deposits of adhesive 44 will flatten and spread to an appropriate thickness but will not extend to the longitudinally outboard side of the boundary plane 32. Over time, the deposits of adhesive 44 will cure to lock the liner pipe 12 relative to the pipe joint 10.

Figure 11:
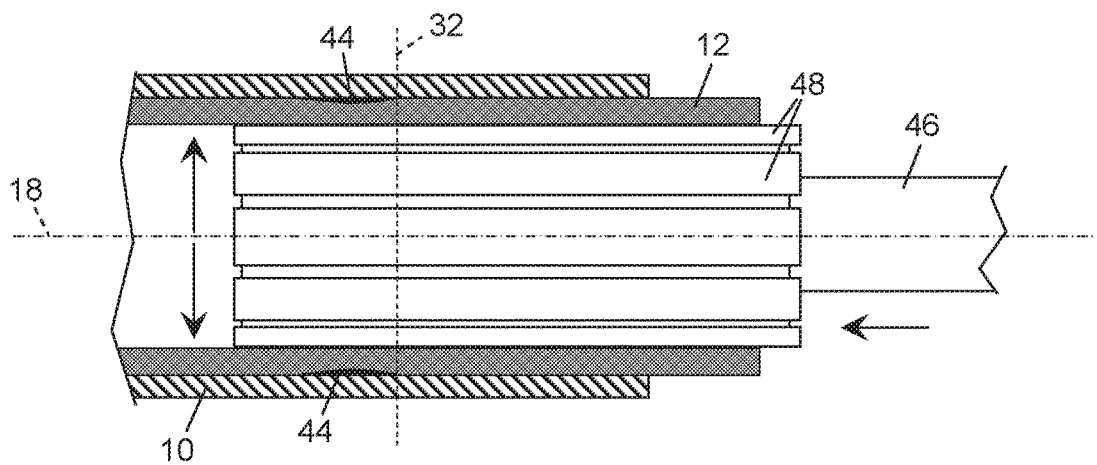

FIG. 11 shows the optional step of inserting a pipe expander 46 into the open end of the liner pipe 12 to accelerate and complete the reversionary expansion of the outboard portion of the liner pipe 12. The pipe expander 46 also straightens the interface between the inboard and outboard portions of the liner pipe 12 around the former location of the distal ends of the shims 34, thereby smoothing the internal surface of the liner pipe 12. For this purpose, the pipe expander 46 comprises an array of radially-movable elements 48 that, when expanded, bears against the interior of the liner pipe 12 to force the outboard portion of the liner pipe 12 against the surrounding interior of the pipe joint 10. Optionally, the pipe expander 46 may remain in place in the expanded state until the deposits of adhesive 44 have cured.

When reversion is complete and the adhesive 44 has cured, the ends of the liner pipe 12 are machined back to define sockets 20 for accepting liner bridges 22 as shown in FIG. 3.

Figure 12:
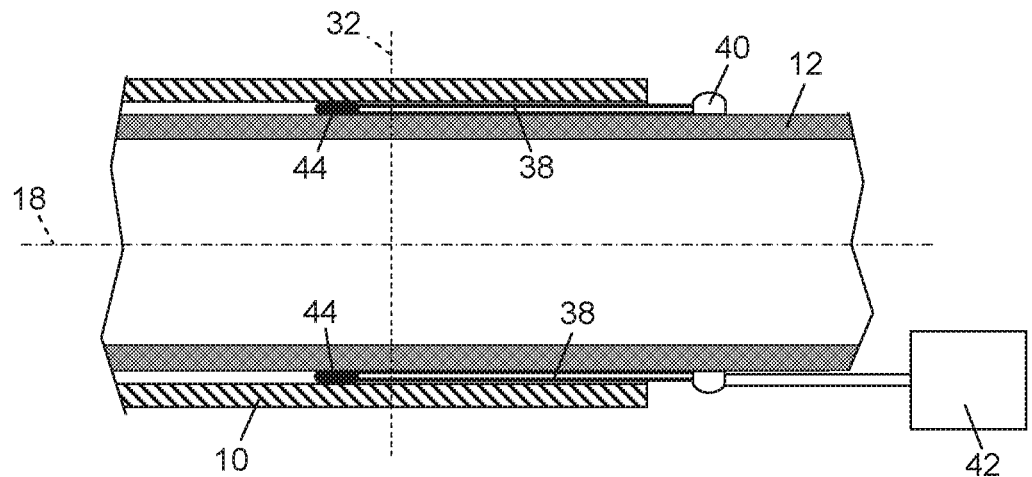
FIGS. 12 to 14 are a sequence of schematic detail views in longitudinal section showing steps of an alternative method of the invention for lining a length of pipe, also involving die drawing.
Figure 13:
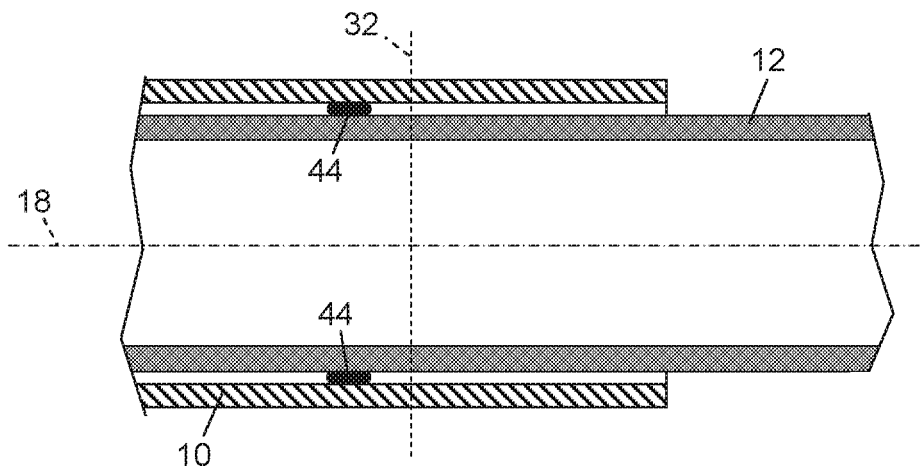
Figure 14:
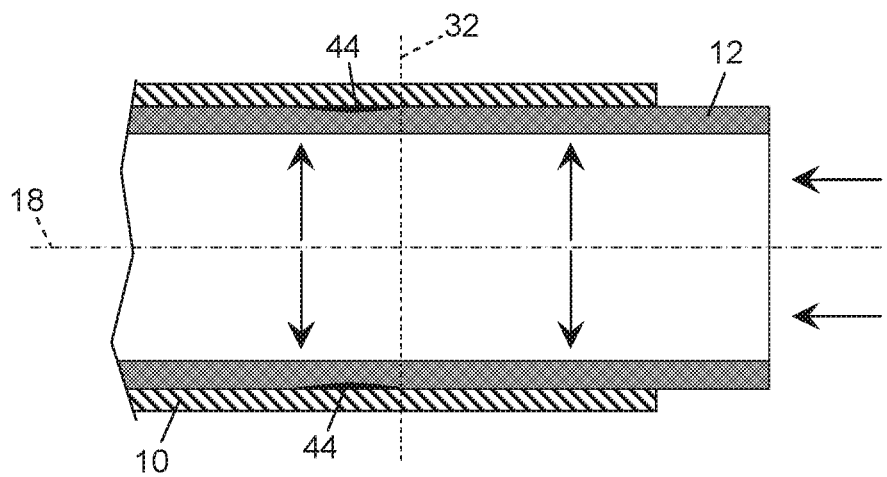

Turning finally to FIGS. 12 to 14, this sequence of drawings illustrates an alternative method of the invention for lining a length of pipe. Again, like numerals are used for like features and this method may be performed on both ends of a pipe joint 10 simultaneously.

In FIGS. 12 to 14, no shims 34 are used. Instead, like the shims 34 of the preceding embodiment, needles 38 in fluid communication with a source 42 of pressurised adhesive 44 via a ring manifold 40 are inserted longitudinally into the annular gap between the liner pipe 12 and the pipe joint 10 when the liner pipe 12 is in the tensioned state shown in FIG. 1. The needles 38 cross the boundary plane 32 so that their distal ends lie on the longitudinally inboard side of the boundary plane 32.

Like the shims 34 of the preceding embodiment, the needles 38 shown in FIG. 12 could, in principle, be inserted into the pipe joint 10 before the liner pipe 12 enters the pipe joint 10 or reaches its final longitudinal position with respect to the pipe joint 10.

FIG. 12 shows the needles 38 having injected respective deposits of adhesive 44 between the liner pipe 12 and the pipe joint 10 on the longitudinally inboard side of the boundary plane 32. FIG. 13 shows the liner pipe 12 remaining in the longitudinally-tensioned and hence radially-contracted state spaced from the surrounding inner surface of the pipe joint 10, after the needles 38 have been removed to leave behind the deposits of adhesive 44.

FIG. 14 shows the situation after reversion following relaxation of the longitudinal tension in the liner pipe 12. Thus, the liner pipe 12 has expanded radially against the surrounding inner surface of the pipe joint 10. The deposits of adhesive 44 have been squashed between the pipe joint 10 and the expanded liner pipe 12, hence flattening and spreading to an appropriate thickness but without crossing to the longitudinally outboard side of the boundary plane 32. Again, the deposits of adhesive 44 will cure over time to lock the liner pipe 12 relative to the pipe joint 10, whereupon the ends of the liner pipe 12 may be machined back to define sockets 20 for accepting liner bridges 22 as shown in FIG. 3.

It would of course be possible to insert a pipe expander 46, like that shown in FIG. 11, into the open end of the liner pipe 12 in FIG. 14 to accelerate and complete the reversionary expansion of the liner pipe 12, and to maximise the bond strength of adhesive 44 between the liner pipe 12 and the pipe joint 10.

Many other variations are possible within the inventive concept. For example, FIG. 8 shows the shims 34 as individual, separate components spaced angularly around the circumference of the liner pipe 12. Alternatively, an expandable supporting frame could connect the shims 34 together in a corresponding angularly-spaced circumferential array. Conversely, the needles 38 that are shown fixed together in FIGS. 7a, 7b and 8 could instead be separate needles 38 each with individual supplies of adhesive 44.

It would also be possible for the needles 38 and the shims 34 to be integrated into a common structure or for shims to serve as injectors instead of employing separate needles 38. Thus, adhesive could be pumped along a duct that extends to the distal end of a shim. Conversely, needles or other injectors could serve as shims instead of employing separate shims 34.

If the shims 34 and/or the needles 38 are held together by a supporting structure such as a manifold 40, that structure could extend completely or partially around the liner pipe 12. Two or more such structures could be used together to encircle the liner pipe 12.

The needles 38 could be withdrawn continuously or intermittently while injecting adhesive 44. This technique could be used to place multiple deposits of the adhesive 44 at longitudinally-spaced locations between the liner pipe 12 and the pipe joint 10. Additionally, or alternatively, this technique could be used to place one or more longitudinally-extending deposits of the adhesive 44 between the liner pipe 12 and the pipe joint 10.

The invention claimed is:

1. A method of manufacturing a length of lined pipe, the method comprising:
   radially contracting a liner pipe;
   inserting the radially-contracted liner pipe into a host pipe;
   inserting at least one injector through an end of the host pipe and into an annular gap between the liner pipe and the host pipe;
   injecting an adhesive through the or each injector at one or more locations, the or each location being between the liner pipe and the host pipe and longitudinally inboard of the end of the host pipe;
   at least partially withdrawing the or each injector from the end of the host pipe; and
   radially expanding at least a portion of the liner pipe to close the annular gap and to bond the liner pipe to the host pipe via the injected adhesive.

2. The method of claim 1, comprising inserting the or each injector into the annular gap after completing insertion of the liner pipe into the host pipe.

3. The method of claim 1, comprising:
   inserting at least one shim through the end of the host pipe and into the annular gap between the liner pipe and the host pipe;
   radially expanding a longitudinally inboard portion of the liner pipe against a radially inner surface of the host pipe;
   by action of the shims, maintaining the annular gap for injection of the adhesive by constraining local radial expansion of a longitudinally outboard portion of the liner pipe; and
   withdrawing the or each shim from the end of the host pipe to permit radial expansion of the longitudinally outboard portion of the liner pipe to close the annular gap after injecting the adhesive.

4. The method of claim 3, comprising inserting the or each shim into the annular gap after completing insertion of the liner pipe into the host pipe.

5. The method of claim 3, comprising inserting the or each injector into the annular gap after inserting the or each shim into the annular gap.

6. The method of claim 3, wherein the or each shim is also an injector.

7. The method of claim 1, comprising radially expanding the liner pipe by elastic reversion.

8. The method of claim 1, comprising radially expanding the liner pipe by applying radially outward force against a radially inner surface of the liner pipe.

9. The method of claim 8, comprising maintaining the radially outward force against the inner surface of the liner pipe until the adhesive has substantially cured.

10. The method of claim 1, comprising injecting the adhesive at locations that are spaced apart circumferentially from each other around the liner pipe.

11. The method of claim 10, comprising inserting a plurality of injectors into the end of the host pipe to perform injection of adhesive at those locations.

12. The method of claim 11, comprising inserting the plurality of injectors together into the end of the host pipe.

13. The method of claim 11, comprising supplying the injectors of the plurality from a shared source of the adhesive.

14. The method of claim 1, further comprising machining a liner bridge socket into the liner pipe after closing the annular gap.

15. The method of claim 14, wherein the or each location at which the adhesive is injected is longitudinally inboard of the liner bridge socket.

16. The method of claim 14, further comprising inserting a liner bridge in the form of an electrofusion fitting into engagement with the socket, while leaving all heating elements of the liner bridge on a longitudinally outboard side of the injected adhesive.

17. The method of claim 1, wherein the liner pipe is contracted radially by die drawing.

18. The method of claim 1, comprising treating an outer surface of the liner pipe by plasma surface treatment, flame treatment or acid etching before inserting the liner pipe into the host pipe.

19. The method of claim 1, comprising repeating injection of the adhesive after partially withdrawing the or each injector from the end of the host pipe.

20. The method of claim 1, comprising injecting the adhesive while withdrawing the or each injector from the end of the host pipe.

21. A lined pipe, comprising:
   a host pipe;
   an inner liner pipe that is engaged with the host pipe primarily by elastic radial expansion of the liner pipe along a mutual interface that extends along substantially the full length of the liner pipe; and
   a secondary adhesive fixing at which the liner pipe is bonded to the host pipe;
   wherein the secondary adhesive fixing comprises one or more discrete deposits of adhesive placed between the liner pipe and the host pipe at one or more locations spaced longitudinally inboard from an end of the host pipe.

22. The pipe of claim 21, wherein two or more of the adhesive deposits are spaced circumferentially from each other around the liner pipe.

23. The pipe of claim 21 or claim 22, wherein two or more of the adhesive deposits are spaced longitudinally from each other along the liner pipe.

24. The pipe of claim 21, wherein the or each adhesive deposit is elongated in the longitudinal direction.

25. The pipe of claim 21, wherein the liner pipe is shaped to define a liner bridge socket that is inset from the end of the host pipe.

26. The pipe of claim 25, wherein the or each adhesive deposit is located longitudinally inboard of the liner bridge socket.

27. The pipe of claim 25, wherein:
   a liner bridge in the form of an electrofusion fitting is engaged with the liner bridge socket; and
   all heating elements of the liner bridge are on a longitudinally outboard side of the or each adhesive deposit.

28. The pipe of claim 21, wherein the host pipe is of steel and the liner is of a thermoplastic polymer.

29. A lined pipeline comprising a series of pipes of claim 21, welded together end-to-end.

30. A hydrocarbon production installation comprising one or more of the lined pipelines of claim 29.

31. The method of claim 1, wherein the adhesive is selected from: acrylate adhesives; two-part acrylic adhesives; two-part epoxy adhesives; single- and two-part polyurethane adhesives; anaerobic adhesives; cyanoacrylate adhesives; hot-melt adhesives; and pressure-sensitive adhesives.

32. The pipe of claim 21, wherein the adhesive is selected from: acrylate adhesives; two-part acrylic adhesives; two-part epoxy adhesives; single- and two-part polyurethane adhesives; anaerobic adhesives; cyanoacrylate adhesives; hot-melt adhesives; and pressure-sensitive adhesives.

\* \* \* \* \*